Aug. 24, 1943.　　　　K. S. KASSLER　　　　2,327,718
TOY
Filed Oct. 3, 1942　　　　2 Sheets-Sheet 1

INVENTOR.
Kenneth S. Kassler
BY
John R. Kerr
ATTORNEY

Aug. 24, 1943. K. S. KASSLER 2,327,718
TOY
Filed Oct. 3, 1942 2 Sheets-Sheet 2
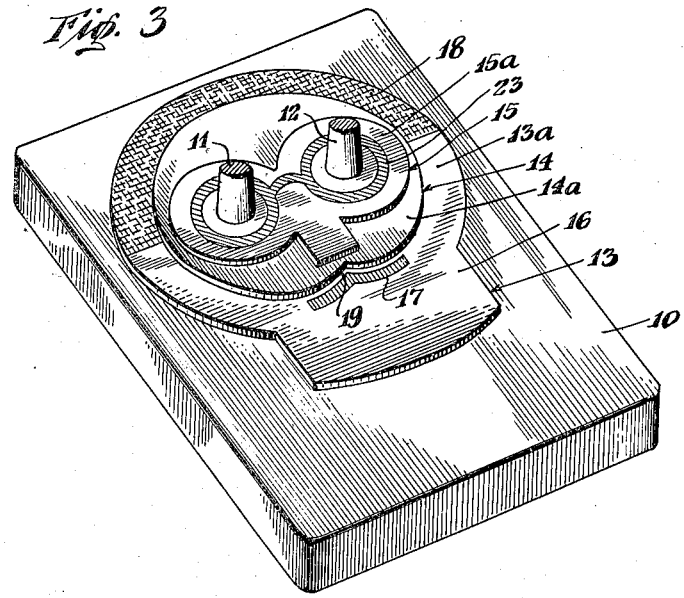
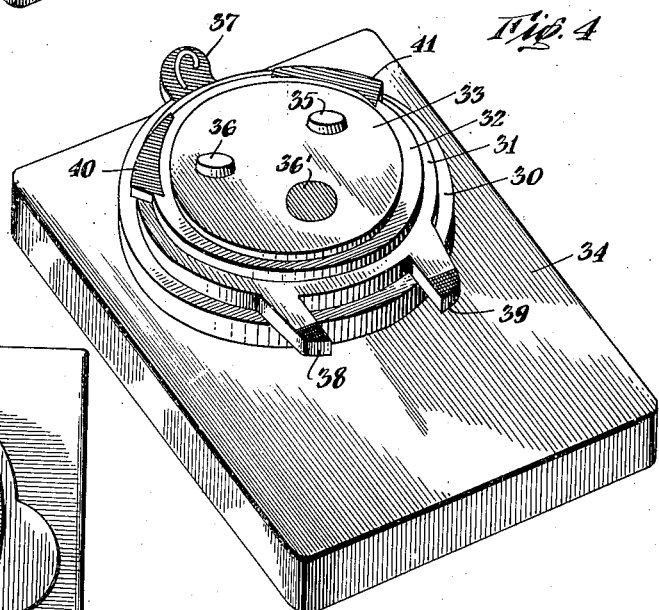
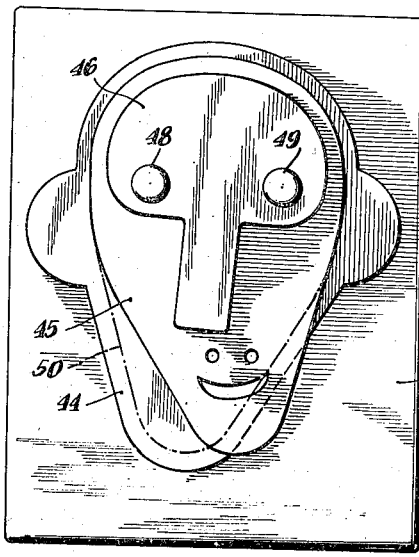
INVENTOR.
Kenneth S. Kassler
BY
ATTORNEY Patented Aug. 24, 1943

2,327,718

UNITED STATES PATENT OFFICE 2,327,718

TOY

Kenneth S. Kassler, Princeton, N. J.

Application October 3, 1942, Serial No. 460,588

4 Claims. (Cl. 35—28)

This invention relates to amusement devices in the form of educational toys. Among the objects of the invention is to provide a toy having a set, or several sets, of detachable pieces which can be readily assembled to construct representative figures, faces or objects and which requires for their assembling a certain amount of mental and physical coordination whereby a child may derive both amusement and instruction. As an instructive plaything for very young children, the toy will teach control of the fingers, as well as instruct and develop the ability to recognize relative proportions and sensible assembly of several pieces for intelligently building them into expressive forms. The amusement feature of the toy is intended to stimulate interest in solving the various combinations in which the pieces can be assembled to form expressive faces or objects, Other objects and advantages of the invention will appear hereinafter in the accompanying description and drawings.

Referring to the drawings, Fig. 1 illustrates an exploded view of several pieces or units of a toy set.

Fig. 3 illustrates the assembly of the pieces or units in the superposed arrangement shown in Fig. 1.

Fig. 4 is an assembled toy wherein the assembled pieces illustrate an object such as a pig.

Fig. 5 is still another assembled toy with one of the units or pieces improperly placed for purpose of demonstration.

Figure 1:
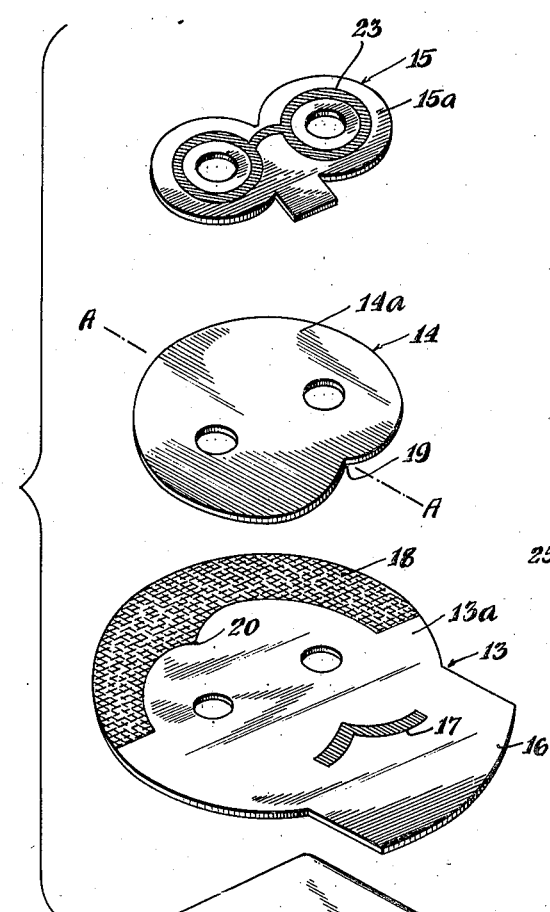
Figure 2:
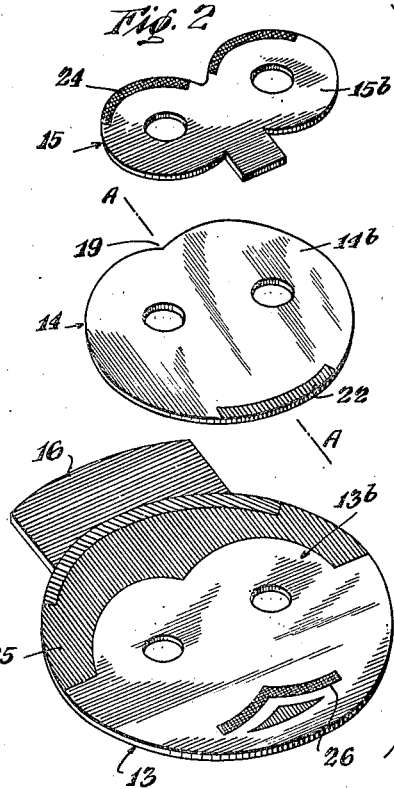
Fig. 2 illustrates an exploded view of three of the individual pieces or units illustrated in Fig. 1, but showing their reverse sides.
Figure 2:
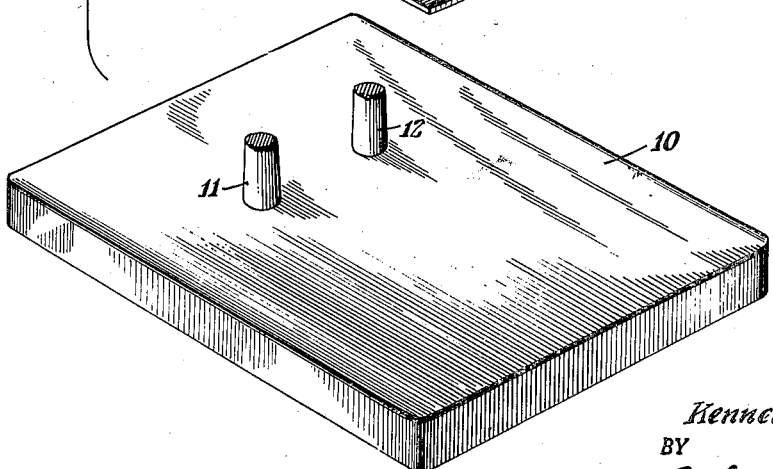

From a study of the various pieces illustrated in Figs. 1 and 2, it will be readily appreciated that several combinations of faces may be made by the use of but three individual pieces each having a different representation on its upper and lower surface. With six pieces there can be provided sixteen different combinations, and by eliminating the middle piece and using only the lower and upper pieces, four additional faces are obtainable from a set of three pieces. With a greater number of individual pieces many more varieties of figures may be produced.

Colors may be used to outline the various design elements of a picture or other expression. For example, the hair can be illustrated on one side of a piece in yellow and on the other side in red; the eyebrows can be outlined in black, red or yellow; the mouth in red, and an eye glass frame in green. The choice of colors is entirely according to taste or the effect desired, but their use is helpful for delineating features desired to be brought out. The background for a face may be cream or flesh-colored, for example. It is apparent that the contours of the pieces for any given set should bear some fairly definite relationship to each other so that when they are assembled they will provide a somewhat sensible picture, although, of course, in some instances such a picture may be designed to be somewhat grotesque or amusing, as desired.

The drawings are intended to illustrate a few possible forms which the pieces may take to demonstrate the principle of the invention, but without limitation.

Each set of pieces is accompanied by a base 10 of somewhat solid construction. The base illustrated in Figs. 1 and 3 is provided with a pair of upstanding pegs 11 and 12, but in some cases a third peg could be provided which would be of use in assisting a child in applying a picture piece in upright fashion with respect to the foot of the base. As illustrated in Fig. 1, the pegs 11, 12 are so spaced as to constitute the eyes of the face of the figure to be constructed. They could, however, be so disposed and shaped to represent some other elements, such as the nose, for example.

Each of the pieces 13, 14 and 15 is provided with a pair of openings for engaging the pegs 11 and 12 and by which the respective pieces are justified in their relationship to each other. When the several pieces as arranged in Fig. 1 are assembled with respect to the registering pegs, they will automatically assume the relationship illustrated in Fig. 3.

The first piece 13 is provided with a neck portion 16, a representation of a mouth 17, and a crest of golden hair 18. Since piece 13 is the larger piece it should be applied first lest it obliterate or entirely cover a smaller piece, and a child should quickly appreciate this. Choice for the first piece is between the design of surface 13a and the design of surface 13b.

The second piece to be positioned in symmetrical about an axis A—A intermediate the two pegs, but it has a reentrant edge 19 which is so designed as to leave uncovered and visible the mouth 17 when placed (see Fig. 3). Inasmuch as this piece is otherwise somewhat circular it will cut off or cover the forelock 20 of hair in the surface 13a in the manner illustrated in Fig. 3.

It will be seen that there are four choices for the position of the second piece 14, two of which are illustrated in Figs. 1 and 2. 14a is the obverse side of the piece 14, and 14b is the reverse side of the same piece, but rotated through 180 degrees in the plane of the paper. With surface 14b uppermost and positioned over surface 13a the inverted V-mouth 17 would be covered and a rounded or laughing mouth 22 would appear in the finished figure. With such arrangement the forelock 20 would remain in the finished figure as this would be uncovered by the reentrant edge 19 of the piece 14. Two other arrangements of piece 14 for constructing additional figures are obtainable simply by rotating the piece 14 as shown in Figs. 1 and 2 about axis A—A.

For completing a figure there remains a choice between the two showings on the opposite sides of the third piece 15. This piece characterizes the eye and nose structure, but it is apparent that these two physical features could be incorporated in two or more individual pieces, if desired.

One side of piece 15 is provided with eye glasses 23 and the other side has eye brows 24 appearing thereon. If the top side 15a of this third piece is selected, the resulting figure will have the appearance illustrated in Fig. 3.

So far, I have described arrangements for the formation of eight different possible figures by the use of the surfaces 13a, 14a, 14b, 15a and 15b. Eight other combinations are possible by the use of figure 13b which appears on the reverse side of the first piece 13. As illustrated in Fig. 2, surface 13b has elements painted thereon in such a manner that the neck portion 16 becomes a hat. The mouth is given a different form as a matter of choice. On this side the hair 25 may be painted a different color such as red. By placing the second piece 14 with its side 14b uppermost, the mouth elements 26 are covered. With surface 14b rotated through 180 degrees the mouth elements 26 are uncovered because the reentrant portion 19 stops short of the mouth 26.

For the third piece there is again the selection between the two sides of the piece 15, depending upon whether or not the figure is to be provided with eye brows or glasses.

It will be seen from the foregoing that a large variety of shapes and of expressions may be obtained, depending upon the fancy of the particular child, it being kept in mind that the principle involved is to provide pieces which, when properly positioned over a number of pegs, will delineate or produce an expressive form or figure.

The various pieces may be made of heavy cardboard, plywood or other serviceable material and there may be as many and varied pieces provided as are deemed desirable or necessary to build up a complete picture. In some cases it is desirable that the various pieces be of different thicknesses so as to give an additional guide to a child and also produce the effect of depth. This idea is generally illustrated in the toy shown in Fig. 4. This toy embodies four separable pieces 30, 31, 32 and 33, and a base plate 34. These pieces characterize a pig with two of the pegs 35 and 36 upstanding from the base plate and providing the eyes, and a third upstanding peg 36 serving as a representation of the pig's nose. All of the pieces are circular in this instance except for projections which designate certain parts of the pig.

The piece 30 is somewhat thicker than the other pieces, and designates the body of the pig from which a tail portion 37 projects. The forward part of the body is represented by the somewhat thinner piece 31 from which the legs 38 and 39 extend. The piece 32 has portions 40 and 41 extending therefrom to represent the pig's ears. This piece is of less thickness than piece 31 and represents generally the forepart or neck of the pig. The top piece 33 rounds out the head and is somewhat thinner than the third piece. The ends of the upstanding pegs 35 and 36 protrude through the uppermost piece 33 to give a pop-eyed expression, but the upper end of peg 36 may be flush with the surface of piece 33 and suitably painted to designate the pig's nose. Coloring of the pig's hoofs, ears and tail help to bring out the illusion.

Fig. 5 is intended to illustrate still another modification wherein three detachable pieces 44, 45 and 46 are shown mounted upon a base 47 which has two pegs 48 and 49. The placement of piece 45 is purposely asymmetrical with respect to pieces 44 and 46 to illustrate how the toy self-indicates an improper placement of a piece. Should piece 45 be reversed, its lower outline would coincide with the dotted outline 50 and thereby assume its proper place to form a symmetrical figure.

It will be readily appreciated that the principle exemplified by the foregoing examples has almost unlimited applications ranging through many different shapes, proportions and subjects matter and that it is adaptable in simple or complex forms. For example, a toy as shown in Fig. 4 may be suitable for a very young child because of its simplicity and the peculiarities of each piece such as its area, thickness, the associated appendages, and the employment of three pegs. The three pegs neccessitate that the pieces be placed correctly to form a figure since they prevent reversal of the upper and lower edges of any piece. The toy of Figs. 1, 2 and 3 is somewhat more complex and therefore more instructive for an older child since it allows for greater play of the imagination by providing for reversal of edges and overturning of pieces at will to produce different effects. Obviously other results are obtainable such as may be accomplished by the angular disposition of the center line of a figure in contrast to a line passing through the centers of the pegs as may be attained by the pieces constituting the toy or model of Fig. 5. In this case the center line is central of the nose and chin, but due to its angularity with the eyes the resulting figure can have the chin pointing either to the left or to the right.

It is optional whether the registering means form the eyes or any other element. They may, if desired, constitute ears, in which case the openings or holes in the several pieces may be provided by notches in their edges. The pegs preferably taper but may be of uniform cross-section, as desired. In some instances where a single peg could appropriately be used it would be desirable that the peg be multi-sided or polygonal in cross-section and engage in similarly shaped holes in the several pieces of the toy. For example, the nose of a clown could be outlined by a peg having a trapezoidal or egg-shaped cross-section with suitable markings for the nostrils and other features. Such a peg would automatically correctly orient the various pieces with respect to each other. Since no other pegs would be required in such a case the eyes could be painted on the topmost piece in different arrangements on its two sides.

What is claimed is:

1. In combination, an amusement device comprising a plurality of separable pieces which when assembled one above another produce a figure, each of said pieces having a contour and design elements peculiar to a portion of the figure, and means engageable with said pieces for determining their proper registry with respect to each other, said engaging means comprising pegs upstanding from the lower of said pieces and providing salient features to the figure so that the assembled pieces and pegs will bear a significant relationship to each other and produce a figure.

2. In combination, an amusement device comprising a plurality of separable pieces which when assembled one above another produce a figure, each of said pieces having a contour and design elements on its surfaces peculiar to a portion of the figure, at least some of said pieces having different design elements on their obverse and reverse surfaces respectively, so as to enable selection of design elements for producing more than one figure from a given set of pieces, and means engageable with said pieces for establishing their proper registry with respect to each other.

3. In combination, an amusement device comprising a base, a plurality of pegs upstanding from said base, and a plurality of separable pieces having holes therein for engagement with said pegs, said pieces having varied forms for creating a representative figure when assembled in a manner predetermined by their form and in superposed arrangement with the pegs of said base passing through the holes in said pieces and providing salient features to the figure.

4. In combination, an amusement device comprising a base, a plurality of pegs upstanding from said base, and a plurality of separable individual pieces, each of said pieces having holes therein for the passage of said pegs and each of said pieces having respectively different contours and design elements representing different portions of a figure so that when the several pieces are superposed in an order predetermined by their contours and design elements any one of several possible figures may be produced by the selected pieces.

KENNETH S. KASSLER.